Figure 4:
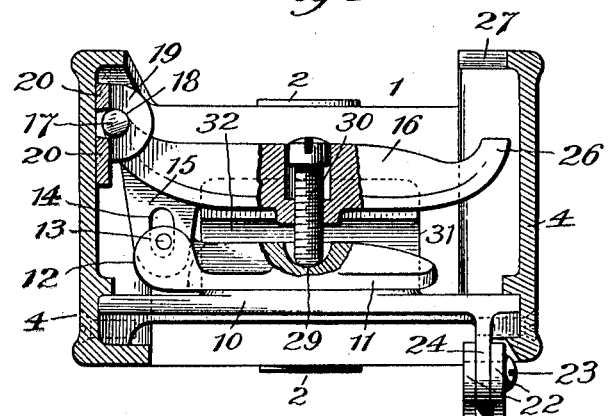

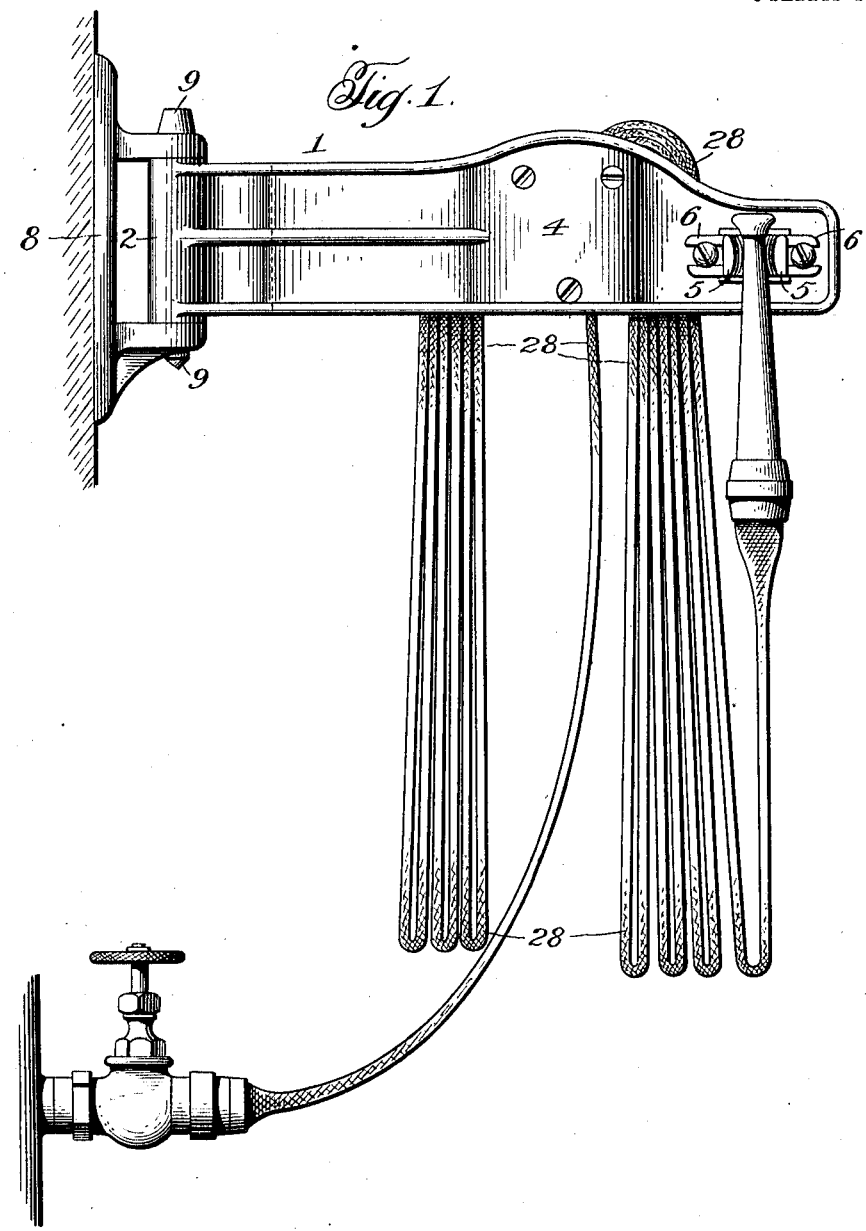

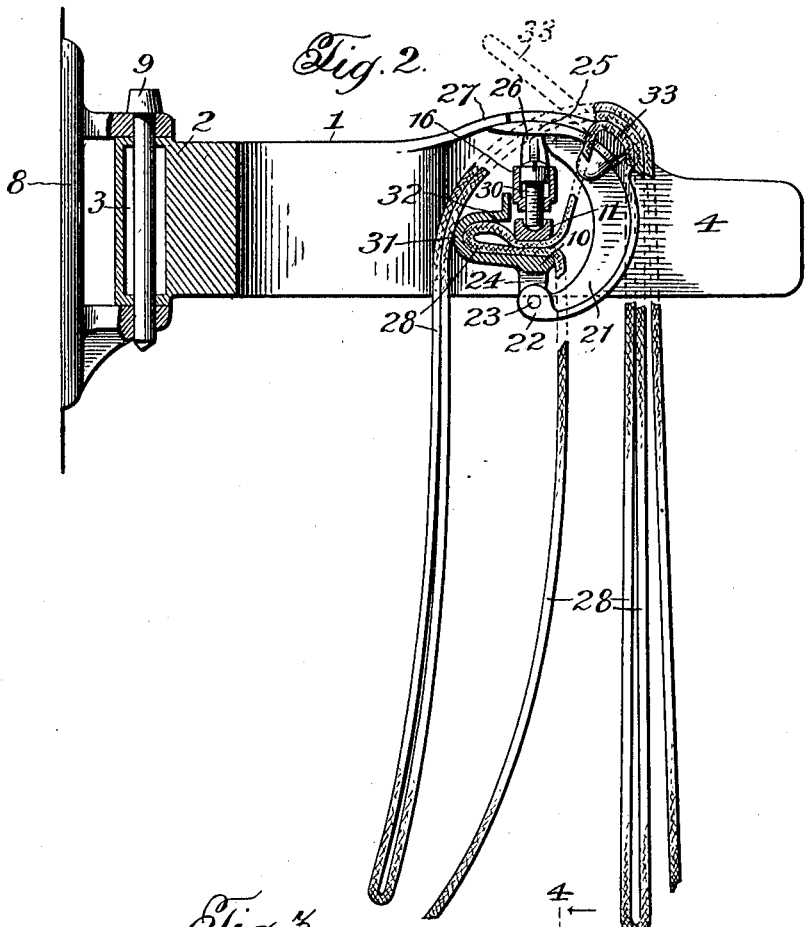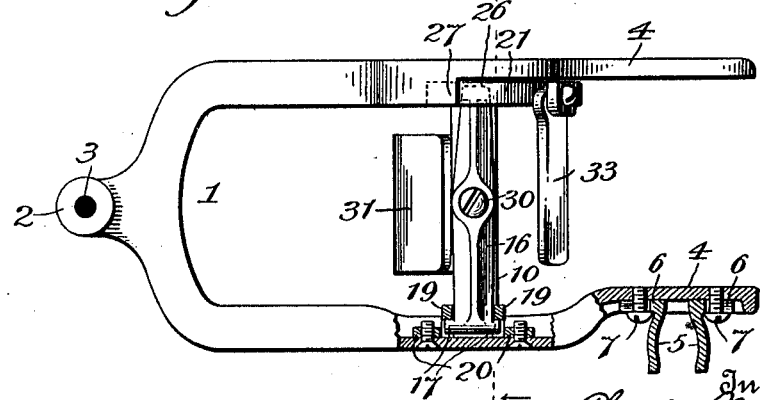

C. & R. NUHRING.
HOSE RACK.
APPLICATION FILED MAR. 20, 1911.

1,004,461.

Patented Sept. 26, 1911.

3 SHEETS—SHEET 3.

Witnesses:
Jas. E. Hutchinson
V. E. Burner

Inventors
Charles Nuhring
Robert Nuhring
By
Attorney

COLUMBIA PLANOGRAPH CO., WASHINGTON, D. C.

UNITED STATES PATENT OFFICE.

CHARLES NUHRING AND ROBERT NUHRING, OF CINCINNATI, OHIO.

HOSE-RACK.

1,004,461.　　　　　　Specification of Letters Patent.　　Patented Sept. 26, 1911.

Application filed March 20, 1911. Serial No. 615,655.

*To all whom it may concern:*

Be it known that we, CHARLES NUHRING and ROBERT NUHRING, citizens of the United States, residing at Cincinnati, in the county of Hamilton and State of Ohio, have invented certain new and useful Improvements in Hose-Racks; and we do hereby declare the following to be a full, clear, and exact description of the invention, such as will enable others skilled in the art to which it appertains to make and use the same.

This invention relates to improvements in hose racks.

A rack of the character mentioned is of the highest efficiency if its construction is such that water or other fire-extinguishing media may be turned into the hose before the latter is drawn from the rack, without, however, unracking the hose by the force of the water, and also without emerging from the nozzle until the latter has been drawn to the place of discharge. Under such conditions the valve of the standpipe to which the hose is connected may be opened immediately upon the discovery of the fire, thus admitting water to the hose for instant discharge when the nozzle has been drawn to the point of the fire, and thereby overcoming the necessity for the user of the hose to return to the valve after laying out the length of the hose. It is highly important, also, that the rack shall be capable of choking off the flow of the water until the nozzle is under full control of the operator, and that the choking of the hose shall be sufficient to withstand the highest water pressure usually found in standpipes and other sources to which fire-extinguishing hose are connected; otherwise, as soon as the water enters the hose the latter will be displaced from the rack by reason of the pressure of the water, and the water discharged from the nozzle before the operator can gain control of the nozzle.

The present invention has in view a rack for supporting hose which is designed to meet the conditions above recited, whereby, while the water may be turned into the hose instantly with the discovery of the fire, and thereby obviate necessity for the user of the hose to return to the valve to open the same, the hose will be effectually choked against passage of the water therethrough until the hose has been removed from the rack, and the nozzle drawn to the point where it is desired to play upon the fire, whereupon the choking of the hose may be instantly terminated, and the water permitted to freely discharge at the nozzle.

The present invention not only has in view the provision of a hose rack equipped with the proper means for choking the hose against the passage of the water until the predetermined conditions recited arise, but also for preventing fouling of the hose incident to the racking of the same, and particularly after use of the hose.

Other objects will appear as the nature of the improvements is better understood, the invention consisting, substantially, in the novel construction, combination and arrangement of parts hereinafter fully described, illustrated in the accompanying drawings, and finally pointed out in the appended claims.

Figure 5:
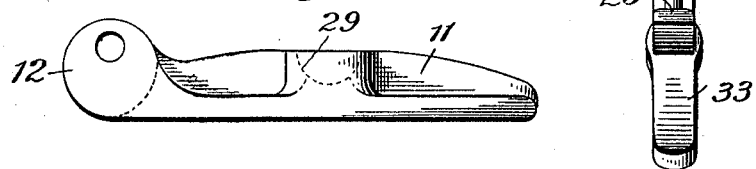
Figure 6:
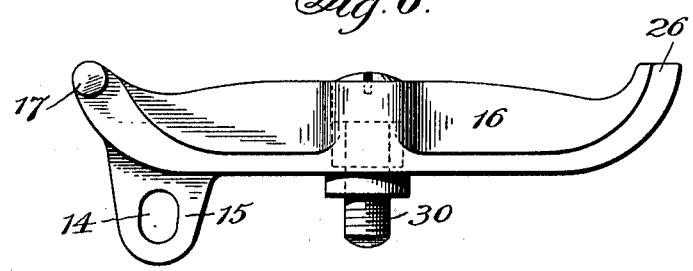
Figure 7:
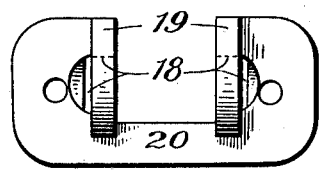

In the drawings—Figure 1 is a side elevation of a hose rack constructed in accordance with and embodying the principles of the present invention, a line of hose being illustrated as racked thereon. Fig. 2 is a longitudinal sectional view thereof. Fig. 3 is a top plan view of the rack, the hose being omitted. Fig. 4 is a transverse sectional view on the line 4—4, Fig. 3, the locking trigger being in open position. Fig. 5 is a detail view of the clamping bar. Fig. 6 is a similar view of the compression bar. Fig. 7 is also a detail view of the hinge plate for the compression bar.

Referring in detail to the accompanying drawings, the numeral 1 designates the body of the herein-described rack. This is formed of a head 2 having suitable provision, such as a perforated passage 3, for mounting the rack in order that it may be capable of a free swinging movement. Integral with the head 2 is a pair of parallel arms 4, the length of these arms being such as may be necessary for accommodating the different lengths of hose for which the rack may be designed.

At the exterior of the free end of one of the arms 4 is arranged a pair of supporting fingers 5, which fingers are designed to embrace the point of a nozzle, and thereby afford means for suspending the nozzle from the rack. Each of the fingers 5 is provided with a bifurcated foot 6 for the reception of securing screws 7, and by the formation of the bifurcated feet, and the employment of the screws 7, the supporting fingers 5 may be moved toward or away from each other to accommodate varying sizes of nozzles.

To support the rack a wall bracket 8 may be employed, as is common, a pin 9, or its equivalent, being used to pivot the rack in the wall bracket, said pin passing through the perforated passage 3.

Adjacent to the lower edges of the arms 4, and substantially midway the length of said arms, is a transversely-extending supporting bar 10, which bar may be held in rigid engagement with the arms 4 by means of screws, or their equivalent. Coöperating with the supporting bar 10 is a clamping bar 11, said clamping bar being arranged above the supporting bar 10 and extending in parallel relation, when in clamped position, with the supporting bar 10. At one end of the clamping bar 11 is a pair of perforated ears 12, said ears receiving a pin 13, and said pin 13 is, in turn, received by an elongated slot 14 formed in a depending lug 15 which is arranged at one end of a compression bar 16. By reason of the elongated slot 14 it is obvious that a certain amount of play may be had between the clamping bar 11 and the compression bar 16. This latter is provided, at the end whereat the depending lug 15 is formed, with oppositely-extending trunnions 17 which are received by perforations 18 formed in parallel ears 19 carried by a hinge plate 20. This hinge plate is detachably connected, as by screws or other suitable means, with one arm of the body 1, and affords means whereby the compression member 16 is capable of swinging in a vertical direction upon the rack.

For the purpose of holding the clamping bar 11 and the compression bar 16 in closed position relatively to the supporting bar 10 a locking trigger 21 is employed. This trigger is in the form of a segmental arm, its lower end being provided with perforated ears 22 through which is passed a pivot pin 23 through the medium of which the trigger 21 is pivotally connected to a depending lug 24 carried by the supporting bar 10.

The free end of the locking trigger 21 has a cam 25 formed thereon, said cam being designed to engage an upwardly-extending abutment 26 formed at the free end of the compression bar 16. Furthermore, the free end of the locking trigger 25 is designed to take under an overhanging lip 27 which is formed upon the arm 4 immediately adjacent to the locking trigger 21, as illustrated in Fig. 2. When thus engaged with the lip 27, it is obvious that the compression member 16 is locked against vertical displacement, and the clamping bar 11 is held in locked relation to the supporting bar 10.

The purpose of the supporting bar 10 and the clamping bar 11 is to tightly hold a bight of the hose therebetween, and to squeeze such bight to a sufficient extent to prevent any water which may enter the hose between the bight, and the valve on the standpipe, from passing into the length of the hose beyond such bight. The bight in question is clearly illustrated in Fig. 2, the hose being designated by the numeral 28, and that the proper pressure may be exerted upon the clamping bar 11 the latter is provided, at a point substantially midway its ends, with a socket 29 which receives the lower end of an adjustable plunger 30. The plunger 30 is in the form of a screw, it being carried by the compression bar 16 at a point substantially midway its ends, and thus in a position for its lower end to freely enter the socket 29. When, therefore, the locking trigger 21 is brought into engagement with the compression bar 16, the latter exerts pressure, through the plunger 30, upon the clamping bar, thereby forcing the latter tightly against the bight of the hose which has been introduced between the clamping and supporting bars. Obviously, the plunger 30 may be adjusted within the compression bar 16, and by such adjustment the clamping bar 11 may be varied in its clamping action in relation to the supporting bar 10.

In order to limit the size of the bight of the hose the supporting bar 10 is provided with a curved guard 31, the free end of said guard terminating at a point adjacent to the compression member 16, and said guard forms a pocket 32 for receiving the bight of the hose. By reason of the guard 31 it is obvious that when the hose is introduced therein the size of the bight is limited, and while permitting the necessary length of the hose, to constitute the proper sized bight, to be introduced to the pocket, said guard will prevent unnecessary length of the hose being employed for this purpose, with a consequent fouling of the hose, due to the possible presence of water in a long bight, particularly so when racking the hose after use.

For displacing the locking trigger 21 from its closed position, and moving it to open position, a pin 33 is pivotally connected thereto. The normal position of this pin is such that it extends transversely of the space between the arms 4. In this position that portion of the hose, which is immediately next to the bight, rests upon the pin 33, the remaining portion of the hose between the bight and the nozzle being passed in alternate loops back and forth over the pin 33 and the compression bar 16, as clearly illustrated in Fig. 2, the nozzle being received by the supporting fingers 5, and it will, therefore, be seen that the bars 10, 11 and 16, and the pin 33 constitute the real support for the folds of the hose, the folds being suspended between the arms 4 in a manner which is common with hose racks.

In the use of the hereindescribed rack the same is supported at a suitable point in proximity to a standpipe, and coupled with the valve thereof in the ordinary way. Upon the discovery of a fire, or when the hose is required for other use, the operator first opens the valve of the standpipe, thereby admitting water to the hose which extends between the valve and the supporting bar 10 and clamping bar 11. It being understood that the locking trigger 21 is in the position shown in Fig. 2, thus holding the clamping bar 11 and the compression bar 16 in closed position, the bight of the hose being clamped between the bars 10 and 11, water will pass only to the bight, at which point further passage of the water is choked. After so opening the standpipe valve, the operator grasps the nozzle of the hose, and removes the same from the supporting fingers 5, and leads the nozzle to the point where the discharge of the water is to be made. In this movement it will be seen that the pendant loops of the hose are successively removed from the rack, and after these loops have cleared the rack further strain on the hose is exerted upon the pin 33, and this strain being continued the same causes the locking trigger 21 to be swung downwardly, thereby withdrawing its free end from beneath the locking lip 27, and away from the abutment 26 carried at the free end of the compression bar 16. The action of the cam 25 being thus removed from the abutment 26, the compression bar 16 and the clamping bar 11 are freed from the strain of the locking trigger, thereby releasing pressure on the bight of the hose, and permitting the water to pass on to the nozzle. The clamping pressure being removed from the hose, the latter now falls away from the rack, and water may pass uninterruptedly through the line of the hose in an obvious manner.

When necessity for the use of the hose ceases, and it is desired to again place the same upon the rack, the proper bight is formed by introducing a folded portion of the hose into the pocket 32. The clamping bar 11 is then positioned upon the bight, the lower end of the plunger 30 being seated in the socket 29, and the trigger 21 is moved upwardly and its free end passed beneath the locking lip 27. In this movement of the locking trigger the cam 25 thereof engages the abutment 26 and forces the compression bar 16 downwardly, this bar, in turn, acting upon the clamping bar 11 to tightly squeeze the bight of the hose upon the supporting bar 10. The pin 33 is now swung to the horizontal position as illustrated in Figs. 2 and 3, whereupon the hose is looped in the manner indicated in Fig. 2, and the nozzle replaced in the supporting fingers 5.

In connection with the foregoing it is stated that the pivotal connection of the pin 33 with the trigger 21 permits the pin to be swung into alinement with the length of the trigger 21, as shown in full lines in Fig. 4, and in such position the pin serves as a handle for easily forcing the free end of the trigger 21 beneath the locking lip 27.

Having thus described the invention, what is claimed as new, and desired to be secured by Letters Patent, is:

1. In a hose rack, the combination with hose-supporting means, of means coöperating therewith to clamp a bight of the hose thereon, and means for locking the clamping means in clamped position.

2. In a hose rack, the combination with hose-supporting means, of means coöperating therewith to clamp a bight of the hose thereon, means for locking the clamping means in clamped position, and means for releasing said locking means.

3. In a hose rack, the combination with hose-supporting means, of means coöperating therewith to clamp a bight of the hose thereon, means for locking the clamping means in clamped position, and means controlled by the removal of the hose for releasing said locking means.

4. In a hose rack, the combination with hose-supporting means, of vertically-displaceable means coöperating therewith to clamp a bight of the hose thereon, and means for locking the clamping means in clamped position.

5. In a hose rack, the combination with hose-supporting means, a vertically-displaceable means coöperating therewith to clamp a bight of the hose thereon, means for locking the clamping means in clamped position, and means controlled by the removal of the hose for releasing said locking means.

6. In a hose rack, the combination with hose-supporting means, of means coöperating therewith to clamp a bight of the hose thereon, and a locking trigger adapted to engage the clamping means for holding the latter in clamped position.

7. In a hose rack, the combination with hose-supporting means, of means coöperating therewith to clamp a bight of the hose thereon, a locking trigger adapted to engage the clamping means for holding the latter in clamped position, and means controlled by the removal of the hose for releasing said trigger from engagement with the clamping means.

8. In a hose rack, the combination with hose-supporting means, of means coöperating therewith to clamp a bight of the hose thereon, said clamping means being capable of vertical displacement, and a locking trigger adapted to engage the clamping means and prevent vertical displacement thereof, whereby to hold the clamping means in clamped position.

9. In a hose rack, the combination with hose-supporting means, of means coöperating therewith to clamp a bight of the hose thereon, said clamping means being capable of vertical displacement, a locking trigger adapted to engage the clamping means to prevent vertical displacement thereof, whereby to hold the clamping means in clamped position, and means controlled by the removal of the hose for releasing said locking trigger.

10. In a hose rack, the combination with hose-supporting means, of means coöperating therewith to clamp a bight of the hose thereon, said clamping means being capable of vertical displacement, and a locking trigger hingedly mounted in relation to said clamping means and adapted to be swung over the latter for engagement therewith, whereby to prevent vertical displacement thereof and hold said clamping means in clamped position.

11. In a hose rack, the combination with hose-supporting means, of means coöperating therewith to clamp a bight of the hose thereon, said clamping means being capable of vertical displacement, a locking trigger hingedly mounted in relation to said clamping means and adapted to be swung over the latter for engagement therewith, whereby to prevent vertical displacement thereof and hold said clamping means in clamped position, and means controlled by the removal of the hose for releasing said locking trigger.

12. In a hose rack, the combination with the body thereof, of a supporting bar extending transversely of said body, means coöperating with said supporting bar to clamp a bight of the hose thereon, and means also carried by said body and coöperating with the clamping means to lock the latter in clamped position upon said supporting bar.

13. In a hose rack, the combination with the body thereof, of a supporting bar extending transversely of said body, means coöperating with said supporting bar to clamp a bight of the hose thereon, and a locking trigger hingedly mounted upon said body and adapted to engage the clamping means to lock the latter in clamped position upon said supporting bar.

14. In a hose rack, the combination with the body thereof, of a supporting bar extending transversely of said body, means coöperating with said supporting bar to clamp a bight of the hose thereon, a locking trigger hingedly mounted upon said body and adapted to engage the clamping means to lock the latter in clamped position upon said supporting bar, and means controlled by the removal of the hose for releasing said locking trigger.

15. In a hose rack, the combination with the body thereof, of a supporting bar extending transversely of said body, means coöperating with said supporting bar to clamp a bight of the hose thereon, said means being vertically displaceable, and a locking trigger hingedly mounted upon said body and adapted to engage the clamping means, whereby to prevent vertical displacement thereof and lock the latter in clamped position upon said supporting bar.

16. In a hose rack, the combination with the body thereof, of a supporting bar extending transversely of said body, means coöperating with said supporting bar to clamp a bight of the hose thereon, said means being vertically displaceable, a locking trigger hingedly mounted upon said body and adapted to engage the clamping means, whereby to prevent vertical displacement thereof and lock the latter in clamped position upon said supporting bar, and means controlled by the removal of the hose for releasing said locking trigger.

In testimony whereof we affix our signatures, in the presence of two witnesses.

CHARLES NUHRING.
ROBERT NUHRING.

Witnesses:
 CHARLES BAUER,
 GEO. A. JACKSON.

---

Copies of this patent may be obtained for five cents each, by addressing the "Commissioner of Patents, Washington, D. C."

It is hereby certified that in Letters Patent No. 1,004,461, granted September 26, 1911, upon the application of Charles Nuhring and Robert Nuhring, of Cincinnati, Ohio, for an improvement in "Hose-Racks," errors appear in the printed specification requiring correction as follows: Page 1, line 25, first occurrence, strike out the word "the"; page 3, line 104, for the article "a" read *of;* and that the said Letters Patent should be read with these corrections therein that the same may conform to the record of the case in the Patent Office.

Signed and sealed this 7th day of November, A. D., 1911.

[SEAL.]

E. B. MOORE,
*Commissioner of Patents.*